Dec. 14, 1937.  G. H. VON FUCHS  2,102,341
PROCESS FOR REACTIVATION OF SPENT CLAY
Filed April 15, 1936
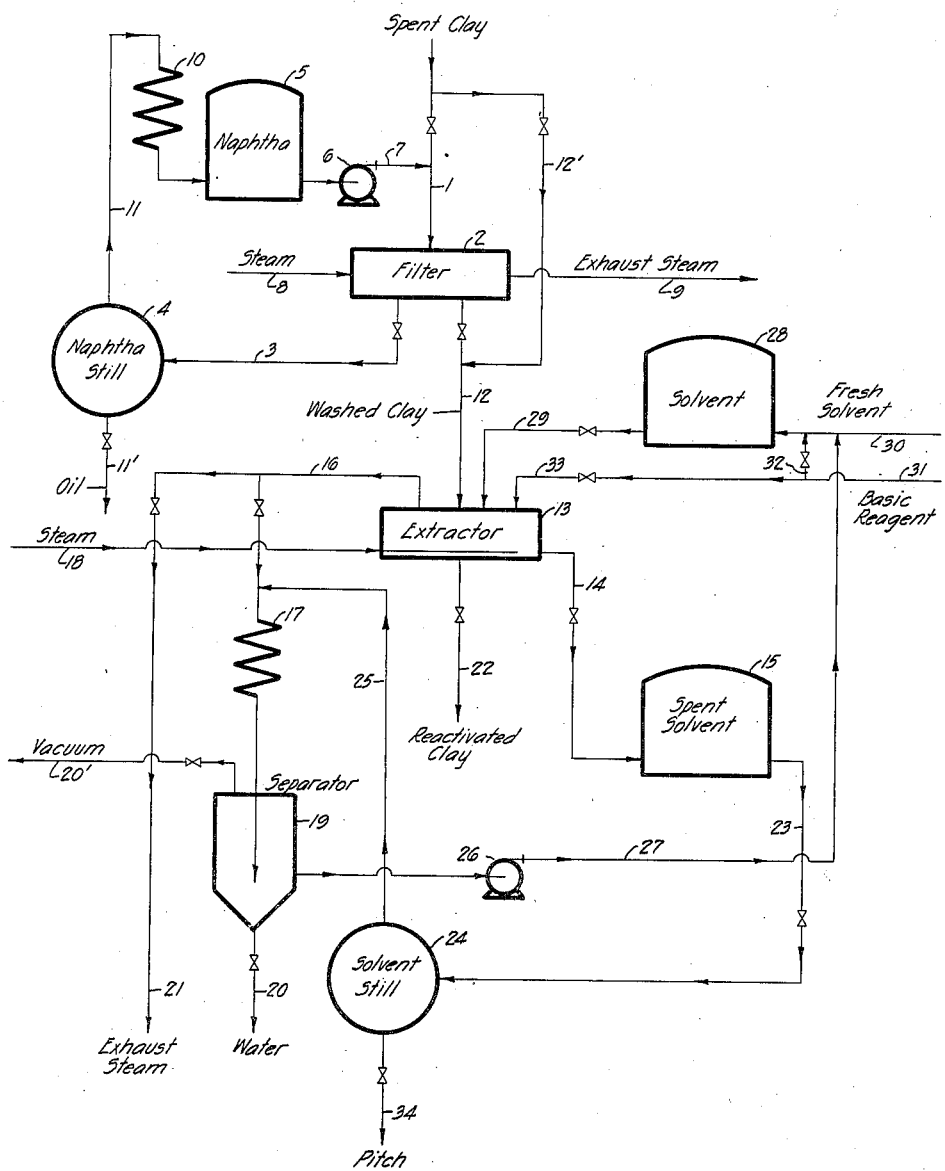
Inventor: George Hugo von Fuchs
By his Attorney:

Patented Dec. 14, 1937

2,102,341

UNITED STATES PATENT OFFICE 2,102,341

PROCESS FOR REACTIVATION OF SPENT CLAY

George Hugo von Fuchs, Wood River, Ill., assignor to Shell Development Company, San Francisco, Calif., a corporation of Delaware Application April 15, 1936, Serial No. 74,498

8 Claims. (Cl. 252—2)

This invention relates to a method of reactivating spent clays of the type used in refining mineral oils and fats.

Clays and similar adsorbent materials such as silica gel, bauxite, etc., are used extensively for treating mineral oils and fats for the purpose of decolorizing and/or neutralizing them. In this treatment tarry and/or acidic constituents of the treating stock are adsorbed by the clay, leaving behind a neutralized oil of improved color and a spent clay. Clays used for this purpose are generally termed refining clays. The term "spent clays" as hereinafter used, shall refer to refining clays or similar substances such as silica gel, bauxite, etc., which have been rendered substantially inactive by virtue of coloring and/or sludge-like matter adsorbed from mineral oils or fats.

It is the purpose of this invention to provide a method for the reactivation of spent clays, which method is more economical and efficient than methods heretofore available, and is applicable particularly to acidic adsorbents of the type hereinbefore mentioned.

As is known, the reason for the inactivity of spent clays is, that a small quantity of adsorbed matter covers the active surface of the clay, which matter is tenaciously held in place and cannot ordinarily be diplaced by non-polar solvents, such as naphtha. To remove this adsorbed matter it has been proposed to use various polar solvents or alkali hydroxides in combination with polar or non-polar solvents. While an alkali hydroxide dissolved in a suitable solvent such as alcohol is very effective for removing the adsorbed matter from acidic adsorbents, it has the disadvantage that subsequently the alkali must be displaced from the clay by treatment with a strong acid such as sulfuric or hydrochloric acid to liberate the active acidic adsorbent. This after-treatment raises the cost of the reactivation process considerably by way of consumption of chemicals and rapid corrosion of standard equipment.

I now have invented an extraction method which obviates subsequent acid treatment and which is as efficient as the method of extracting with an alcoholic solution of caustic. My method consists substantially of treating the spent clay with a quantity of a non-acidic stable solvent for the adsorbed matter, which quantity is in excess of that required to merely moisten the clay and is sufficient to produce a slurry, in the presence of a volatile basic reacting substance which is adsorbed by the clay in a manner to permit subsequent separation therefrom, separating the excess solvent from the clay and then expelling the remainder of the former from the clay by steaming the latter. To accelerate the removal of the basic substance by steaming, the steam may contain an acid gas such as $CO_2$, $SO_2$, $H_2S$, HCl, etc. Both the solvent and the basic reacting substance should be substantially stable under the conditions of the extraction and steaming, and should not polymerize to form non-volatile polymerization products. Instead of treating with a combination of a non-acidic solvent and a basic substance, I may treat with a single alkaline reacting solvent.

The object of my invention will be more fully understood from a description of the drawing representing a flow diagram, to which it is now referred.

Spent clay, preferably in the form of a slurry, enters through line 1 into filter 2. The liquid portion of the slurry which may be naphtha, oil, etc., is withdrawn through line 3 into still 4. When the filter 2 has been charged with a sufficient amount of clay, the flow in line 1 is stopped and naphtha from tank 5 is forced by pump 6 in line 7 through the filter, for the purpose of removing as much as possible of heavy oil which the clay may contain. The washed clay is then blown with a gas such as steam, air, hydrocarbon gas, flue gas or the like, for the purpose of drying, which gas enters filter 2 through line 8 and leaves through exhaust pipe 9.

The naphtha used for washing runs to still 4 where it is subjected to distillation, naphtha vapors going to tank 5 after being condensed in condenser 10 situated in line 11, and oil accumulating in the bottom of still 4 being discharged through line 11'.

The washed blown clay is now transferred to the extractor 13 by transfer means indicated as line 12. The transfer may be accomplished by blowing the clay through a suitable conduit, conveying with a mechanical conveyor, or merely allowing it to drop by gravity. If desired, the primary washing operation in filter 2 may be omitted and the crude spent clay may be charged to the extractor 13 through by-pass 12', and transfer means 12.

The clay in the extractor 13 is now brought into direct contact with a suitable non-acidic solvent which enters the extractor from tank 28 through line 29. This solvent may or may not be alkaline. If it is not, or very weakly alkaline, a basic reacting volatile agent such as ammonia may be injected into it at a suitable point. For instance, the basic reagent may be introduced into the solvent tank 28 through lines 31 and 32, or it may be injected through line 33 into the extractor 13 containing the spent clay, before or during the extraction of the solvent.

The extractor may be operated as a batch agitator, i. e., by agitating batches of clay, solvent and/or basic reagent; or as a filter, i. e. by passing through a bed of clay a stream of solvent and/or basic reagent. After the clay in the extractor 13 has been sufficiently washed in one of the manners described, the liquid is withdrawn through line 14 to tank 15.

The extraction may be carried out at substantially atmospheric temperatures or at an elevated temperature below the boiling point of the solvent. Since normally the solvent power increases with increasing temperatures, it may often be desirable to extract at superatmospheric temperatures and pressures.

When the bulk of the liquid has been removed, the remainder may be evaporated from the clay in extractor 13, preferably under vacuum and/or with the aid of steam. Vapors comprising solvent, base and steam pass through line 16 and are condensed in condenser 17, while steam from line 18 may be blown through the clay. If the solvent and/or the base are miscible with water, it may be well not to commence steaming, until most of the solvent has been removed from the clay by dry vacuum distillation to avoid the necessity of subsequently having to separate it from water by an additional fractional distillation. The condensate is collected in separator 19, separated water, if present, being withdrawn through drain 20. The necessary vacuum may be maintained by a pump not shown, attached to line 20'.

After substantially completing the removal of the solvent from the clay, steaming is continued, preferably with wet steam, until the exhaust steam blown through exhaust line 21 shows no further trace of alkalinity. Steaming may then be discontinued and the clay which is now fully restored is dropped out through discharge 22. The steaming operation may last several hours.

The spent solvent from tank 15 is transferred through line 23 to solvent still 24 where it is redistilled. The vapors pass through line 25, are condensed in condenser 17 and go by way of separator 19 and pump 26 in line 27 to solvent tank 28, from where solvent is fed to the extractor 13 through line 29. Makeup solvent is introduced into tank 28 through line 30.

A pitch accumulating in still 24 is withdrawn through line 34.

Solvents, in order to be useful for the purpose of this invention, must be vaporizable without decomposition at substantially atmospheric pressures and must not polymerize when in contact with adsorbents. Furthermore, the solvents must be non-acidic, as otherwise they would neutralize the alkaline substance thereby rendering it inactive. Phenols and carboxylic acids are therefore excluded from the list of solvents. Following is a list of preferred groups of solvents covering polar as well as non-polar substances with examples of individual solvents in each group: Mono alcohols, such as methyl, ethyl, propyl, isopropyl alcohols, primary, secondary and tertiary butyl alcohols, amyl alcohols, cyclohexyl alcohol, benzyl alcohol, phenyl methyl carbinol, phenyl dimethyl carbinol, furfural alcohol; aldehydes such as acetyl aldehyde, butyl aldehydes, benzaldehyde, furfural; ketones, such as acetone, methyl-ethyl ketone, di-ethyl ketone, methyl-propyl ketone, methyl-butyl ketone, ethyl-butyl ketone, dipropyl ketone, methyl-phenyl ketone; condensation products of alcohols, aldehydes and/or ketones such as ethyl acetal, butyl acetal, di-acetone; ethers, such as di-ethyl ether, iso-propyl ethyl ether, methyl-phenyl oxide, ethylene glycol alkyl ethers, di-ethylene di-oxide, tetra methylene oxide, furfuran; mono nitro hydrocarbons, such as nitro methane, nitro ethane, nitro propane, nitrobenzene; hydrocarbons, such as naphtha, gasoline, aliphatic pentanes, cyclopentane, aliphatic and/or cyclic hexanes, heptanes, benzene, toluene, xylene; chlorinated hydrocarbons such as chloroform, carbon tetra chloride, dichlor ethane, tetra-chlor ethane, trichlor ethylene, di-chlor propane, butyl chloride.

Outstanding among the listed solvents are the ketones of 4 to 7 carbon atoms and chloroform.

Particularly good results were obtained with the following mixtures of polar and non-polar solvents: methyl or ethyl alcohol with aromatic hydrocarbons; acetone with aromatic hydrocarbons; ketones of 4 to 7 carbon atoms with aliphatic, aromatic and/or chlorinated hydrocarbons; alcohols of 3 to 5 carbon atoms with aromatic and/or chlorinated hydrocarbons.

The alkaline reacting volatile substance which is added to the solvent may be chosen from the following list of groups of compounds: ammonia gas; volatile saturated organic ammonia derivatives, such as primary, secondary and tertiary amines, like alkyl amines, such as mono-, di- and tri-methyl amine, ethyl, propyl, isopropyl, butyl, amyl amines; diamines such as ethylene diamine, tri-methylene diamine, tetra methylene diamine; aromatic amines such as aniline; mono alkanol amines, such as mono methanol amine, mono ethanol amine; alkyl hydrazines, such as methyl, ethyl, propyl, isopropyl, butyl hydrazines; pyridine, quinoline, and homologues; petroleum bases; pyrrol and homologues; alkyl imines, such as ethylene imine, tri-methylene imine, pyrrolidene, piperidine, piperazine.

Of the above nitrogen bases, ammonia is one of the most useful in admixture with solvents, because of its low boiling point, which makes its removal from the absorbent by steaming relatively easy. However, certain of the organic bases, although higher boiling than ammonia, are frequently removed as readily because they are weaker bases and are more easily dislodged from the surface of the adsorbent.

It is understood that volatility is a fundamental requirement of the useful solvents and bases, i. e., their boiling points should not be above about 250° C. and preferably below about 200° C., for it is difficult completely to remove substances of boiling points above 200° C. from adsorbents by steaming. Another requirement is that suitable solvents and basic substances be stable under the conditions of the treatment and in particular resist polymerization. Cyclohexanone for instance, which is an excellent solvent, is unsuitable, because it polymerizes to a considerable extent under the influence of clays. Olefinic ketones and aldehydes, diolefines, and many other highly unsaturated compounds polymerize also, and therefore are unsuitable.

Many of the organic bases have very pronounced unpleasant odors, so that the adsorbents treated with such malodorous bases may retain the odor even after prolonged steaming, and subsequently the odors may be transmitted to oils treated with the restored adsorbents. In some cases the bases tending to impart unpleasant odors to the adsorbents may not be used. Among the bases which may have to be eliminated for this reason but which otherwise are extremely valuable because of their excellent solvent properties are pyridine and petroleum bases.

On the other hand, many of the normally liquid bases, particularly those of aromatic character like pyridine and petroleum bases, being good solvents for adsorbed matter, may be used by themselves and in the absence of additional solvents of the type hereinbefore described, provided they are not excluded because of their malodor.

In the illustrative examples given in Table I the effect of ammonia on the power of various solvents to remove adsorbed matter from clay used to refine hydrocarbon oils is clearly shown. 100 gram samples of the spent clay were extracted in one operation with 1000 milliliters of the solvent with or without ammonia.

Table I

| Solvent | Grams of adsorbed matter extracted | |
|---|---|---|
| | Without NH₃ | With NH₃ |
| Naphtha | .54 | 2.28 |
| Benzene | 1.77 | 5.17 |
| Carbon tetrachloride | .74 | 5.11 |
| Acetone | 3.32 | 3.51 |
| Methyl-ethyl ketone | 5.14 | 7.66 |
| Methyl-isobutyl ketone | 5.50 | 6.13 |

Table II below shows extraction results in two steps with methyl ethyl ketone as solvent on oil free spent clay previously extracted with naphtha-ammonia and carbon tetrachloride-ammonia respectively:

Table II

| | Extraction | Grams of adsorbed matter extracted | |
|---|---|---|---|
| | | Without NH₃ | With NH₃ |
| Naphtha and NH₃ | First | 3.76 | 4.41 |
| Extracted | Second | 1.00 | 1.54 |
| Total | | 4.76 | 5.95 |
| Carbon tetrachloride and NH₃ | First | 3.13 | 4.03 |
| Extracted | Second | .86 | 2.01 |
| Total | | 3.99 | 6.04 |

When, in the above examples, the ammonia was replaced by other basic substances, for instance, by alkyl amines, very similar results were obtained. Pyridine alone produces a result comparable to that of benzene with ammonia.

In the foregoing examples it is shown that various solvents respond differently to the addition of basic substances with respect to their solvent and displacing power for matter adsorbed by the clay.

Often it is possible to obtain a solvent effect with a mixture of solvents comprising at least one polar and one substantially non-polar solvent in the presence of the basic substance, which effect cannot be obtained otherwise. Typical examples of polar solvents are the alcohols, ketones, aldehydes, nitroalkanes, while the hydrocarbons, carbon tetrachloride, di-chlorethane, etc. are substantially non-polar. In the table below this principle is demonstrated, various blends of ethyl alcohol and benzene being used to extract spent clay with and without ammonia.

Table III

| Alcohol | Benzene | Grams of adsorbed matter extracted | |
|---|---|---|---|
| | | Without NH₃ | With NH₃ |
| 100 | 0 | .35 | .96 |
| 80 | 20 | .76 | 1.09 |
| 60 | 40 | 1.45 | 1.56 |
| 40 | 60 | 2.30 | 3.45 |
| 20 | 80 | 2.47 | 3.23 |
| 0 | 100 | .07 | .63 |

Under some circumstances, it may be desirable to first extract a portion of the adsorbed matter with one or several neutral solvents, or with a mixture thereof, and then complete the extraction with a solvent in the presence of a basic substance. Such a procedure may be useful when it is desired to utilize the adsorbed matter, for instance as oiliness or anticorrosive compounds in lubricating oils, since by this method a preliminary fractionation of the adsorbed matter can be achieved.

To determine the efficiency of a fully extracted clay after removal of the basic reacting solvent and after thorough steaming, if desired in the presence of an acidic gas, the clay is tested by contacting it with a suitable oil and comparing the color of the oil so obtained with the color of an oil produced by similar treatment with a fresh clay. Spent clays, when properly extracted, as hereinbefore described, and steamed until the exhaust steam shows no further trace of the basic substance, are as efficient as the fresh clay. Reactivated spent clays which are not fully extracted due to insufficient displacing and/or solvent power of the solvent, never achieve a decolorizing power equal to that of the fresh clay even after prolonged steaming. Thus a spent clay extracted, for instance, with benzol in the presence of ammonia may reach a maximum decolorizing efficiency of less than 50% of the original clay, whereas the same spent clay extracted with a 70/30 mixture of benzol-alcohol in the presence of ammonia will reach an efficiency equal to that of fresh clay.

I claim as my invention:

1. In the process of reactivating a spent refining clay containing adsorbed organic matter, the steps of extracting same with a mixture comprising a predominating amount of benzene and a smaller but substantial amount of ethyl alcohol in the presence of sufficient ammonia to displace the adsorbed matter from the clay.

2. In the process of reactivating a spent refining clay containing adsorbed organic matter, the steps of extracting same with methyl-ethyl ketone in the presence of sufficient ammonia to displace the adsorbed matter from the clay.

3. In the process of reactivating spent refining clay containing adsorbed organic matter, the steps of extracting same with a neutral organic solvent for said adsorbed organic matter in the presence of sufficient ammonia to displace the adsorbed matter from the clay, said solvent being volatile and substantially stable under the conditions of the extraction.

4. In the process of reactivating spent refining clay containing adsorbed organic matter, the steps of extracting same with a neutral organic solvent for said adsorbed organic matter containing polar organic components in the presence of sufficient ammonia to displace the adsorbed matter from the clay, said solvent being volatile and substantially stable under the conditions of the extraction.

5. In the process of reactivating spent refining clay containing adsorbed organic matter, the steps of extracting same with a neutral organic solvent for said adsorbed organic matter containing an alcohol having 1 to 5 carbon atoms in the presence of sufficient ammonia to displace the adsorbed matter from the clay, said solvent being volatile and substantially stable under the conditions of the extraction.

6. In the process of reactivating spent refining clay containing adsorbed organic matter, the steps of extracting same with an aliphatic ketone having 4 to 7 carbon atoms in the presence of sufficient ammonia to displace the adsorbed matter from the clay.

7. In the process of reactivating spent refining clay containing adsorbed organic matter, the steps of extracting same with chloroform in the presence of sufficient ammonia to displace the adsorbed matter from the clay.

8. In the process of reactivating spent refining clay containing adsorbed organic matter, the steps of extracting same with a neutral organic solvent for said adsorbed organic matter in the presence of sufficient ammonia to displace the adsorbed matter from the clay, said solvent being volatile and substantially stable under the conditions of the extraction, separating said solvent from the clay and steaming the latter with steam containing an acidic gas.

GEORGE HUGO von FUCHS.